United States Patent [19]

Königbauer et al.

[11] Patent Number: 5,399,959
[45] Date of Patent: Mar. 21, 1995

[54] CIRCUIT ARRANGEMENT FOR CONTACTLESS SWITCHOVER OF OPERATION PARAMETERS OF AN ELECTRICALLY DRIVEN TOOL

[75] Inventors: Egon Königbauer, Olching; Wolfgang Millauer, Munich, both of Germany

[73] Assignee: Hilti Aktiengesellschaft, Liechtenstein, Germany

[21] Appl. No.: 976,589

[22] Filed: Nov. 16, 1992

[30] Foreign Application Priority Data

Nov. 14, 1991 [DE] Germany .................. 41 37 386.3

[51] Int. Cl.⁶ .......................... G05F 5/00; G05F 1/40
[52] U.S. Cl. ..................................... 323/300; 323/282
[58] Field of Search ................... 323/282, 300, 239

[56] References Cited

U.S. PATENT DOCUMENTS

| | | | |
|---|---|---|---|
| 4,001,663 | 1/1977 | Bray | 323/17 X |
| 4,811,184 | 3/1989 | Koninsky et al. | 323/282 X |
| 4,847,546 | 7/1989 | Bobier et al. | 323/282 X |
| 4,862,013 | 8/1989 | Konopka | 323/289 X |

*Primary Examiner*—Steven L. Stephan
*Assistant Examiner*—E. To
*Attorney, Agent, or Firm*—Anderson Kill Olick & Oshinsky

[57] ABSTRACT

A circuit arrangement is disclosed for a non-contacting switch-over of operational parameters in an electrically driven tool, for instance, a hammer drill, which are determined by a voltage divider ratio with reference to a stabilized supply source. The voltage divider ratio is obtained by selective parallel switching of an additional ohmic resistor by means of a Hall switch, whose current supply is supplied by a Zener diode which lies in series with the stabilized supply source. The circuit of the Hall switch puts the low point of the additional resistor, connected through a diode, to the low point of the voltage divider, in parallel with the partial resistor of the voltage divider, through a drop resistance. The switching arrangement or circuit arrangement has the advantage that the current supply of an RPM control unit is only slightly additionally loaded or increased.

4 Claims, 1 Drawing Sheet

1

CIRCUIT ARRANGEMENT FOR CONTACTLESS SWITCHOVER OF OPERATION PARAMETERS OF AN ELECTRICALLY DRIVEN TOOL

FIELD OF THE INVENTION

The present invention deals with a circuit arrangement for the contactless or non-contacting switch-over of operational parameters of an electrically driven tool, which are determined by a nominal or rated voltage value, and which are obtained from a stabilized supply source, through a resistive voltage divider, and which are changeable, switch-selected variations of the voltage divider ratio.

BACKGROUND OF THE INVENTION

In known electrically driven tools as, for instance, hammer drills, which are equipped with an electronic drive regulation, operational or regulation parameters, such as RPM, or nominal current values, are changed or switched-over by actuation devices which carry contacts, which may, for instance, be potentiometers, step switches, or switch-over devices. Such actuation devices, which carry contacts, are malfunction prone due to wear, dust, and moisture influences, which are well known. They are also sensitive to shock or jarring and their useful life is limited. The idea to utilize non-contacting changeover devices, for instance, non-contacting switches, field plate potentiometers, etc., which are commercially available as self-contained, independent units, has also been tried. Unfortunately, these commercially available components are unsuitable for installation into electrically driven tools, or only into large units, since they themselves are too large as a component and frequently require their own current supply, which results, overall, in a considerable cost increase of the electric tool.

SUMMARY OF THE INVENTION

The invention is based upon the task of creating a non-contacting actuation arrangement, for electrically driven tools, of the type mentioned, which is distinguished by low current consumption and can be integrated as a component into the space available in an electronic drive regulation structural group as well as into the internal construction of the electronics arrangement provided therefor.

In a circuit arrangement for a non-contacting switch-over of operational parameters of an electrically driven tool, which are determined from a nominal voltage value obtained from a stabilized supply source, by means of a resistive voltage divider, and which are variable by a switch-selected variation of the voltage divider ratio, the invention is characterized in that the change of the voltage divider ratio is performed by selective parallel switching of an additional ohmic resistor onto a partial resistance of the voltage divider by means of a non-contacting switch, whose current supply comes from a voltage source, in series with the stabilized supply source, and whose switching circuit applies the low end of the additional resistor to the low end potential of the voltage divider, or disconnects it therefrom, by making a rectifier or gate electrically conductive or by blocking same.

Based on the invention, the three dimensional disposition in the tool, in connection with the drive regulation component, is possible, in such a manner, that the actuation occurs in a simple manner, through a stimulation element which is actuatable by means of an adjustment or actuation-lever or by means of an actuation push-button, which effects the switch-over of the non-contacting switch if the actuation travel is changed. A Hall element or Hall switch has been found to be expedient by way of a non-contacting switch whose stimulation element is a small permanent magnet.

The gate or rectifier is advantageously constituted by a diode, blocked when the Hall switch is blocked, whose anode is connected to the low end of the voltage divider and whose cathode, on the one hand, is connected with the low end of the additional resistor, and on the other hand, through a drop or series resistance with the switching circuit of the Hall switch. It is expedient, because of reasons explained detail below, if the resistance values of the additional and/or drop-resistance are selected to be approximately of the same order of magnitude.

Accordingly, it is an object of the present invention to provide a circuit arrangement for a contactless switch-over of operational parameters, of an electrically driven tool, which is based upon the task of creating a non-contacting actuation arrangement, and which is distinguished by low current consumption and can be integrated as a component into the space available in an electronic drive regulation structural group as well as into the internal construction of the electronics arrangement provided therefor.

Other objects and advantages of the present invention will be made apparent to those skilled in the art upon a review of the Description of the Preferred Embodiment taken in conjunction with the drawing which follows.

DESCRIPTION OF THE PREFERRED EMBODIMENT

Figure 1:
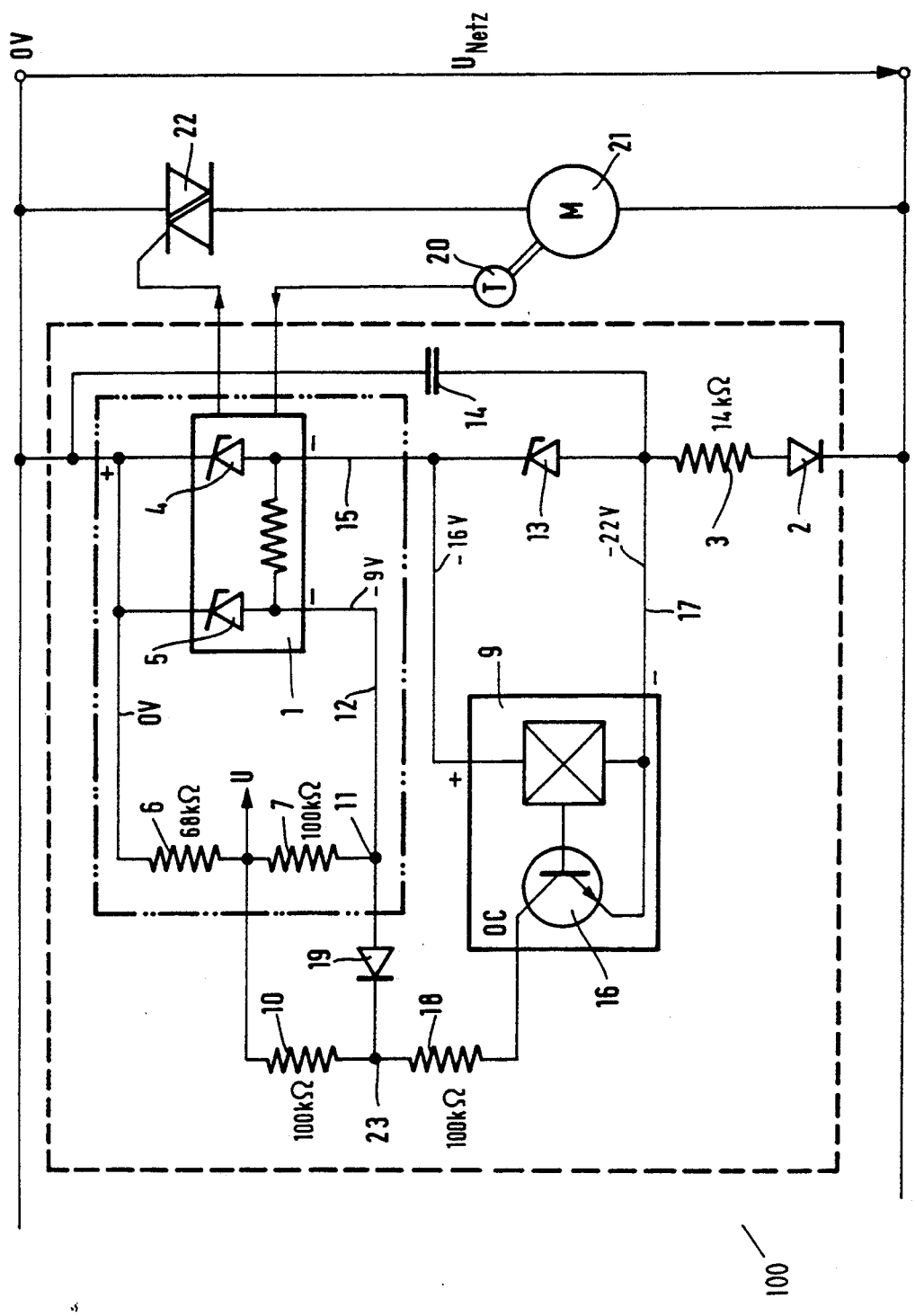
FIG. 1 illustrates the circuit diagram of the circuit arrangement which is the subject of the present invention.

FIG. 1 illustrates the circuit diagram of the circuit arrangement which is the subject of the present invention and which is denoted by the reference numeral 100. It should be noted that only those components which are essential for the present invention are shown in detail in the circuit diagram of FIG. 1, which illustrates the RPM-regulation component group for a hammer drill. In order to simplify the overview, it can be noted that the electrically driven tool has to be switched over in between two fixed values for the maximum RPM nominal value. The parts and components of an RPM control device, known in the state of the art, for reasons of clarity, have either been deleted or shown only by diagrammatic lines.

The function of the RPM control is usually assumed by an integrated switching circuit 1, which is supplied from the network through a diode 2 and a drop resistance 3. The switching circuit 1 contains voltage stabilization devices, which are shown in outline by Zener diodes 4, 5, wherein the Zener diode 4 performs a pre-stabilization and the Zener diode 5 performs a (more accurate) post stabilization. The post stabilized voltage serves for supplying the entire regulation circuit, of which, in the case of the present invention, only a resistive nominal value voltage divider 6, 7 is shown, at which a switch-over is to be performed which will be described below. A switch-over of the divider ratio from the resistors 6 and 7 can, for instance, be achieved by switching a third resistor 10, which is connected with the interconnect point of the resistors 6 and 7, directly to the low value or low point 11 of the nominal value voltage divider. In order to accomplish this, however, the switch element, which is to be provided, should itself have a galvanic connection with the low end of the resistance 11, meaning it must be connected, at least at this point, with the low end line 12.

If a non-contacting switching circuit, for instance, an integrated Hall switching circuit, or a Hall switch 9, is used as a switching element, the circuit should be connected to the low end resistance by the negative terminal of the current supply. This, however, assumes that the current supply of the integrated Hall switch 9 must lie in parallel with the RPM control circuit 1, which receives an input signal from a tachometer generator 20 of a drive motor 21 and issues the RPM control signal on the output side to a Triac 22 (triode AC semiconductor switch) in series with a motor 21. This condition, however, cannot be fulfilled in many instances since the current consumption of the integrated Hall switch exceeds the load or current carrying capacity of the current supply which is provided, or which results in an excessive output loss in the circuit of the RPM control 1 and in the drop resistance 3.

The above-mentioned problem is overcome in the circuit arrangement of the present invention by arranging the RPM control circuit 1 and the switching circuit 9 in series with the current supply. For this purpose, a Zener diode 13 is inserted in series with the current supply input of the RPM control circuit 1 and the usual required smoothing capacitor 14 bypasses or shunts the series circuit of the stabilization elements 4, 5 and 13. Also, a stabilized supply voltage is available at the Zener diode 13, with which voltage, the current supply circuit of the Hall switch 9 is connected.

The output of the Hall switch 9, typically, and as also shown in the embodiment of FIG. 1, is a transistor 16 with an open (collector) output OC. With the transistor 16 conducting, the collector output OC is switched to the potential of a line 17, which, in the embodiment shown in FIG. 1, carries the negative potential of the entire current supply. The output OC of the transistor 16 is connected, through a resistor 18, with the low end of the additional voltage divider resistor 10. This connecting point is further connected by a diode 19 with the low end 11 of the voltage divider 6, 7 in the polarity arrangement shown in FIG. 1.

It is assured, by a suitable dimensioning of the resistors 10 and 18, and with due regard to the existing differences in potential shown by way of an embodiment in FIG. 1, that, in the conductive state of transistor 16, a small current flows through the diode 19, which maintains said diode in a conductive state. This fixes, in the embodiment of FIG. 1, the potential of the connecting point of the resistances 10 and 18, with the cathode of the diode 19, to a value fixedly allocated to the potential on the line 12, which will only differ by the diode threshold of the diode 19 from the potential on the line 12, independently of how much the potential on the line 17 differs from that on line 12. The additional resistor 10 will thereby apply a constant current to the resistive voltage divider 6, 7, whereby the nominal output voltage $V_{nominal}$ is reduced by a constant value which is referred to as the potential at the low end 11.

If, on the other hand, the transistor 16 is blocked or is non-conductive, the diode 19 is also maintained in the non-conductive state and the resistor 10 does not carry any current. In this manner, $V_{nominal}$, again referred to the potential at the low end 11, jumps to a higher value which is determined by the divider ratio of the resistors 6 and 7.

In the embodiment of the circuit arrangement, as illustrated in FIG. 1, the output voltage $V_{nominal}$ is the reference input magnitude for the operational parameters, such as, for instance, the RPM control. In a switch-over, the additional load on the voltage divider 6, 7 occurs by means of the additional resistor 10 in the manner described.

One can switch between two operational parameters, in the embodiment shown, the following switching functions:

a) Switching condition 1 of the Hall switch 9:

The output OC is highly resistive or has a high impedance (Open Collector). The voltage $V_{nominal}$ is preset only by the ratio of the resistors 6 and 7, wherein the voltage is divided between zero and the potential on the line 12. The Hall switch 9 is thus highly resistive, so that no current flows through resistor 10. Thus, the diode 19 is also blocked since the potential of $V_{nominal}$ is more positive than that on the line 12. It follows therefrom, that no current can flow also through resistor 10 and, thus, there is no load on the voltage dividers 6, 7.

b) Switching condition 2 of the Hall switch 9:

The output OC now lies on the potential on the line 17. The output voltage of the voltage divider 6, 7 is changed by the components 10, 19, 18 and 16. The now conducting Hall switch 9 puts the output OC on the potential of the line 17. The connecting point 23 of the components 18, 19 and 10 is applied, through the resistor 18, to a fixed value corresponding to the conducting threshold of the diode 19 which is below the potential of the line 12. Because of the potential difference between the connecting point of the resistors 6, 7 and 10, at the junction point 23, there flows an additional current, which reduces the potential of the nominal value $V_{nominal}$. Since the diode threshold is within certain limits, independent of the current through the diode 19, the junction point 23 lies, at a fixed value, below the potential on the line 12, independently of the resistor 18 or the potential on the line 17. Potential fluctuations on the line 17 do not change the voltage $V_{nominal}$. It must merely be assured that a specific current, which is sufficient for the bias voltage, flows through the diode 19.

In a tested embodiment of the present invention, the potential ratios on the different lines or points may be as stated in FIG. 1. The same also applies to the stated values of the resistors 6, 7, 10 and 18.

While the present invention has been described in a preferred embodiment, said description is only illustrative of the present invention and is not to be construed as a limitation thereof. Accordingly, the present invention encompasses any and all modifications, variations and/or alternate embodiments of the circuit arrangement described herein with the scope of the present invention limited only by the claims which follow.

What is claimed is:

1. A circuit arrangement for a contactless switch-over of operational parameters of an electrically driven tool, comprising:

a stabilized supply source;

a voltage divider which comprises a plurality of first resistors;

a second resistor, wherein said second resistor is an ohmic resistor which provides a second resistance;

a contactless switch;

a voltage source which provides a source of current to said contactless switch; and a diode, wherein said contactless switch-over of said operational parameters of said electrically driven tool is determined by a nominal voltage ($V_{nominal}$) which is obtained from said stabilized supply source through said voltage divider and which is variable by a switch-selectable change of a voltage divider ratio of said voltage divider, and further wherein said change of said voltage divider ratio is performed by a selective switching of said second resistor in parallel with one of said first resistors of said voltage divider by means of said contactless switch, wherein said contactless switch has a current supply which comes from said voltage source which lies in series with said stabilized supply source, and further wherein a circuit of said contactless switch, in a conducting state, puts a low end of said second resistor on a low end potential of said voltage divider by making said diode conductive and, in a non-conducting state, separates said low end of said second resistor from said low end of said voltage divider by blocking said diode.

2. The circuit arrangement of claim 1, wherein said contactless switch is a Hall switch, the voltage supply of which is tapped through a Zener diode which is switched in series with said supply source.

3. The circuit arrangement of claim 2, wherein said diode is blocked if said Hall switch is blocked, and wherein an anode of said diode is connected with a low end of said voltage divider, and further wherein a cathode of said diode is connected with a low end of said second resistor and through a third resistor which provides a drop resistance with a circuit of said Hall switch.

4. The circuit arrangement of claim 3, wherein resistance values of said second resistance and said drop resistance is selected so as to be approximately of the same order of magnitude.

* * * * *